United States Patent [19]

Schröder-Brumloop et al.

[11] Patent Number: 5,367,240
[45] Date of Patent: Nov. 22, 1994

[54] LOW COST CURRENT SENSOR FOR FAST-SWITCHING INVERTER APPLICATIONS

[75] Inventors: Helmut L. Schröder-Brumloop; Rüdiger Löb, both of of Berlin, Germany

[73] Assignee: Otis Elevator Company, Farmington, Conn.

[21] Appl. No.: 989,444

[22] Filed: Dec. 11, 1992

[51] Int. Cl.$^5$ ............................... H02P 1/24
[52] U.S. Cl. .................... 318/727; 318/813; 318/732; 363/95; 363/96; 363/97; 363/98
[58] Field of Search .............. 318/727, 813, 732; 363/95, 96, 97, 98

[56] References Cited

U.S. PATENT DOCUMENTS

| | | | |
|---|---|---|---|
| 4,520,298 | 5/1985 | Abbondanti | 318/490 |
| 4,958,118 | 9/1990 | Pottebaum | 318/727 |
| 4,994,725 | 2/1991 | Gschlössl | 318/727 |

Primary Examiner—William M. Shoop, Jr.
Assistant Examiner—Karen Masih

[57] ABSTRACT

The DC link current from one leg of a DC link of an inverter is provided to a primary winding of an AC current transformer, and a voltage across the secondary winding of the current transformer is integrated for providing an envelope indicative of the DC link current.

2 Claims, 1 Drawing Sheet

LOW COST CURRENT SENSOR FOR FAST-SWITCHING INVERTER APPLICATIONS

TECHNICAL FIELD

The present invention relates to sensing current in the DC link of an inverter.

BACKGROUND OF THE INVENTION

In operating an elevator door system, it is important to know if the doors are not operating properly because something is blocking the doors from closing or opening. One way to do this is to measure the motor current; if an object is stuck in the doors, the motor current increases to supply enough current, and therefore door motor torque, to overcome the obstruction and nudge the doors closed. Typically, such a motor is an induction motor fed by a three-phase AC current provided by an inverter, itself responsive to a DC bus voltage, across a DC link. One way to determine the load current in the motor is to measure a current in the DC link, and particularly the DC component, which is proportional to the motor load current. For the protection of DC link current sensor circuitry it is also important that whatever DC link current sensing circuit is connected to the elevator control system be insulated from the DC bus voltage circuitry.

A straightforward method to obtain the DC component of the DC link current is to connect the primary side of a DC current transformer to the DC link and obtain the DC component of the DC link current straight off the secondary side. DC current transformers are expensive, however.

The next possible solution would be to connect an AC current transformer in the same way. But, given that the current in the DC link of an inverter for an elevator drive is on the order of ten amperes, a suitable transformer is large and therefore expensive, though not as expensive as a DC current transformer. Such a current transformer is difficult to install because of its size and requires heavy-duty means for securing it, involving still more cost.

DISCLOSURE OF THE INVENTION

Objects of the present invention include measuring the active motor load current.

The present invention is predicated on the observation that an envelope of a voltage across the secondary side of a small current transformer which has its primary side connected to a DC link of an inverter follows the envelope of a DC link current.

According to the present invention, a DC link current from one leg of a DC link of an inverter is provided to a primary winding of an AC current transformer, and a voltage across the secondary winding of the current transformer and across a burden resistor connected across the secondary winding, is integrated for providing a voltage indicative of the DC link current.

An advantage of the present invention is that a small AC current transformer is used for obtaining a DC link current which AC current transformer is cheaper, lighter, smaller, and easier to install than a DC current transformer or a larger AC current transformer used for getting the DC link current of the secondary side of the DC or AC current transform.

BEST MODE FOR CARRYING OUT THE INVENTION

Figure 1:
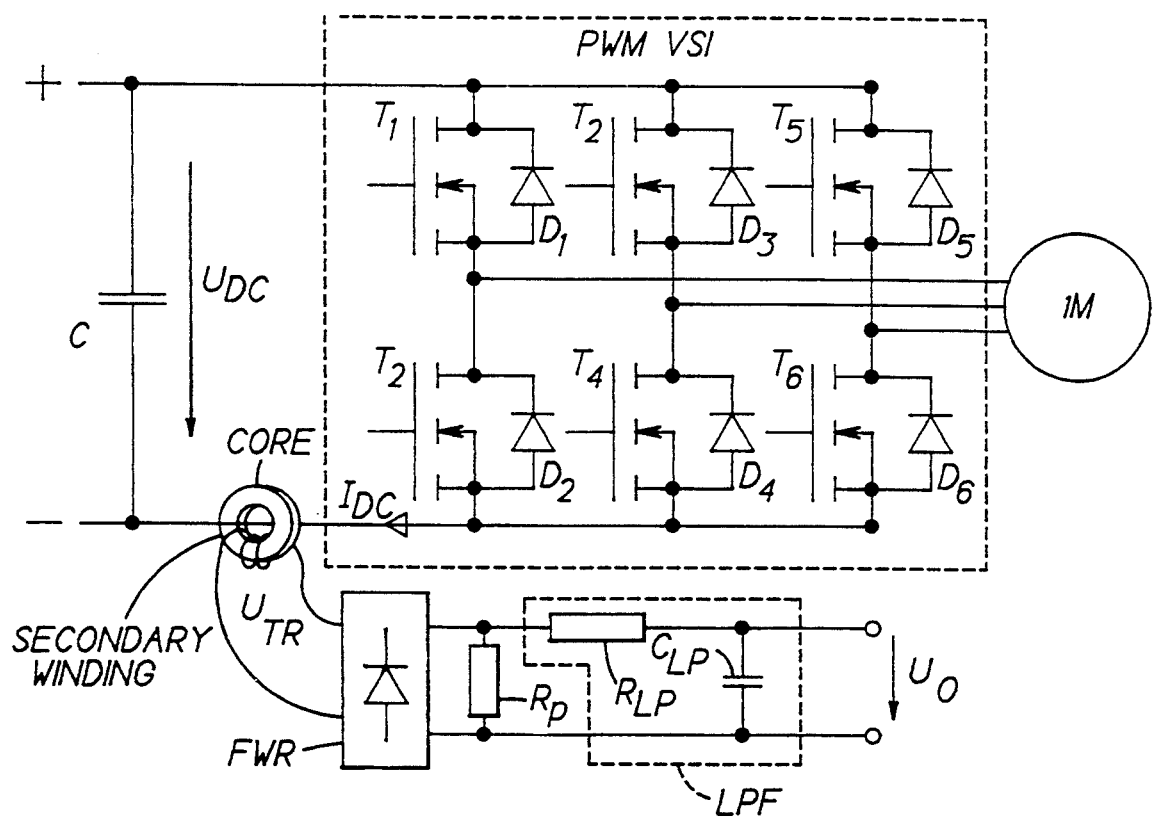
FIG. 1 is a circuit diagram of an inverter employing the present invention.

FIG. 1 shows a circuit employing the present invention. A pulse width modulation voltage source inverter (PWMVSI) is responsive to a DC bus voltage $U_{DC}$ across a buffer capacitor C. The PWMVSI provides three phase voltages U, V, W to an induction motor (IM). Switching of transistors $T_{1-6}$ in the PWMVSI occurs in response to a DC bus voltage according to one of many pulse width modulation (PWM) schemes well known in the art. Moreover, the scheme for controlling the switching, whether of the pulse width modulation variety or some other, is unimportant to the invention as long as the switching frequency is greater than the fundamental frequency by an order of 100. Connected across each transistor $T_{1-6}$ is a free-wheeling diode $D_{1-6}$ for providing a path for reactive current flow when its respective transistor $T_{1-6}$ is off.

Figure 2:
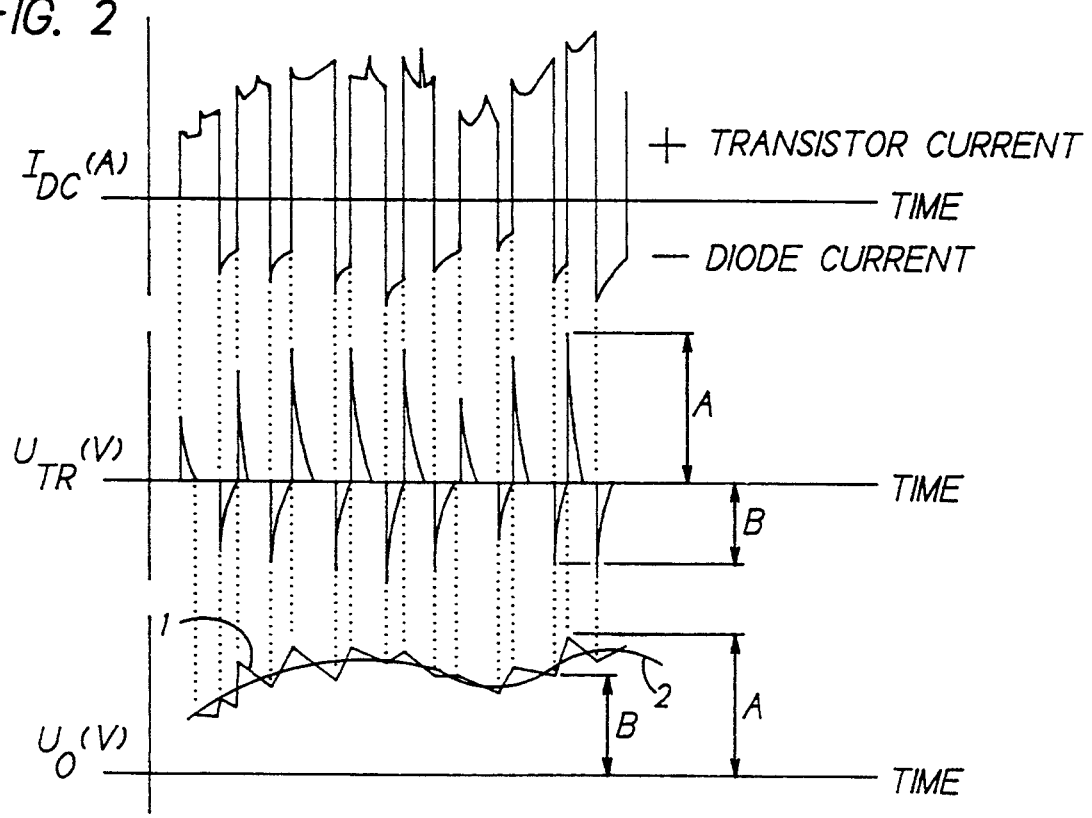
FIG. 2 is a graph of DC link current $I_{DC}$ and output voltage $U_{TR}$ from a secondary winding of a current transformer and an integral of that voltage, $U_O$.

The current transformer core is connected to one leg of a DC link for providing information indicative of a DC link current $I_{DC}$, which itself indicates an active load current in the motor. The current transformer comprises a primary winding, which is simply the leg of the DC link, a magnetic core, and a secondary winding. A voltage $U_{TR}$ is provided across the secondary winding of the current transformer. The chosen current transformer is so small and the frequency of switching relative to the $I_{DC}$ fundamental so high, that the current transformer transmits only each edge of a switching event occurring in the PWMVSI and reflected in the DC link current $I_{DC}$ and therefore the voltage $U_{TR}$ across the secondary. In between each switching cycle, the core saturates as shown in the graph of $U_{TR}$ (FIG. 2). Where the switching frequency is small relative to the fundamental, a larger core is needed. To the extent that the switching frequency is not much larger than the fundamental of the DC link current $I_{DC}$ (for example, $f_{switching}/f_{fundamental} \approx 10\text{-}20$), the current transformer saturates more slowly and the series of voltage triangle wave forms provided across the secondary winding of the current transformer does not accurately represent the DC link current $I_{DC}$.

The output voltage of the current transformer $U_{TR}$ is full wave rectified and then integrated in a low-pass filter (LPF). The full wave rectifier (FWR) allows use of positive and negative edges of the switching events of the DC link $I_{DC}$ and leads to the best approximation of $I_{DC}$. The full wave rectification allows a higher acquisition rate of changes in the DC link independent of their direction. This allows the design of an LPF with a higher corner frequency, that is, a faster response to changes in the load current. The full wave rectification also allows an acquisition of load currents in both directions, representing driving and braking of the machine.

A resistor $R_P$ in parallel with a capacitor $C_{LP}$ of the LPF allows that capacitor $C_{LP}$ to discharge. The resistor $R_P$ also allows the secondary current to flow from the secondary winding of the current transformer (burden resistor).

The output voltage $U_0$ from the integrator corresponds to the fundamental of the DC link current $I_{DC}$ and therefore the active load current in the motor. The DC component of the DC link current $I_{DC}$ is provided as well as AC components with frequencies below the switching frequency as determined by the corner frequency chosen for the LPF. Only changes in the DC link current $I_{DC}$ are transferred through the current transformer. The corner frequency accordingly is chosen to be a little higher than the fundamental frequency of the DC link current $I_{DC}$. The LPF makes an envelope of the voltage $U_{TR}$ because the switching frequency is greater than the corner frequency and the LPF cannot pass the entire voltage $U_{TR}$, but only charge and discharge slowly. The LPF cannot follow the DC link current $I_{DC}$ if the switching frequency is approximately equal to the fundamental of DC link current $I_{DC}$.

FIG. 2 shows the DC link current $I_{DC}$, voltage $U_{TR}$, and output voltage $U_0$. Each edge of the DC link current $I_{DC}$ is given by a switching event in the PWMVSI. The AC component in the DC link current $I_{DC}$ is the result from the commutation from the current conducting transistor to its opposite freewheeling diode. At each switching event, the DC link current $I_{DC}$ changes direction. The upper half of the DC link current $I_{DC}$ is represented by the current to the transistors $T_{1-6}$ while the lower half represents the current through one of the free-wheeling diodes $D_{1-6}$.

As the DC link current passes through the current transformer, the small core saturates quickly so that only the edges of the DC link current are provided in the voltage $U_{TR}$ from the current transformer. $U_{TR}$ is the mathematical derivative of the DC link current $I_{DC}$. The triangle waveform voltage $U_{TR}$ is full wave rectified and then integrated in the LPF producing the output voltage $U_0$, waveform 1, which indicates the DC link current $I_{dc}$. The relationship between $I_{dc}$ and $U_0$ is better seen by comparing waveform 2 and $1_{dc}$. The jagged nature of the output voltage $U_0$ from the LPF is a function of the charging and discharging of the LPF capacitor. The height of the positive peaks A and negative peaks B corresponds to heights A and B in the graph of $U_0$.

It should be understood by those skilled in the art that various changes, omissions, and additions may be made herein without departing from the spirit and scope of the invention.

We claim:

1. A method for sensing the load current in an induction motor controlled by a voltage source inverter, comprising:
   providing a DC link current of said voltage source inverter through a primary winding of an AC current transformer for providing a voltage across a secondary winding of said current transformer;
   integrating said voltage for providing an envelope of said voltage indicative of a fundamental component of said DC link current and therefore said load current.

2. An apparatus for detecting motor load current for an induction motor, comprising:
   an AC current transformer, responsive to a DC link current in a voltage source inverter and for providing AC voltage to said induction motor, for providing a voltage from a secondary winding of said AC current sensor;
   a low-pass filter, responsive to said voltage for providing an envelope of said voltage indicative of said load current.

* * * * *